(12) United States Patent
Kuhlmann et al.

(10) Patent No.: US 6,354,429 B2
(45) Date of Patent: *Mar. 12, 2002

(54) AGRICULTURAL CROP MATERIAL WINDROW INVERTING METHOD AND APPARATUS

(75) Inventors: Lawrence E. Kuhlmann, North Platte; Eugene H. Schmidt, Madrid, both of NE (US)

(73) Assignee: A.I.L. Inc., North Platte, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,481

(22) Filed: Dec. 1, 1999

(51) Int. Cl.$^7$ ............................................... B65G 65/02
(52) U.S. Cl. .................... 198/510.1; 198/314; 198/300; 56/376; 56/377
(58) Field of Search ................ 56/376, 377; 198/510.1, 198/314, 300

(56) References Cited

U.S. PATENT DOCUMENTS

| | | | | |
|---|---|---|---|---|
| 3,496,713 A | * | 2/1970 | Reinhardt et al. | 56/366 |
| 4,730,447 A | * | 3/1988 | Fisher | 56/377 |
| 4,736,577 A | * | 4/1988 | Fisher | 56/370 |
| 4,738,092 A | | 4/1988 | Jennings | 56/372 |
| 4,926,625 A | * | 5/1990 | Laquerree | 56/376 |
| 5,251,431 A | * | 10/1993 | Shoop | 56/366 |
| 5,893,262 A | * | 4/1999 | Harbach | 56/208 |

OTHER PUBLICATIONS

Rowse Windrow Fluffer brochure, Rowse Hydraulic Rakes Company, Inc., Burwell, Nebraska.
New Holland Windrow Inverter brochure, New Holland North America, Inc., 1966.
Swathers Liner Range brochure, Claas of America, Inc., Columbus, Indiana.
PhiBer Swath Turner brochure, PhiBer Manufacturing, Manitoba, Canada.
Miller Pro Avalanche Power Merger brochure, Miller Pro, St. Nazianz, Wisconsin.

* cited by examiner

*Primary Examiner*—Christopher P. Ellis
*Assistant Examiner*—Richard Ridley
(74) *Attorney, Agent, or Firm*—Greer, Burns & Crain, Ltd.

(57) ABSTRACT

An apparatus for inverting a windrow of agricultural crop material on the ground as the apparatus moves along the windrow in a first direction has a lifting mechanism for lifting the crop material from the ground substantially without destroying the integrity of the windrow as the apparatus moves in the first direction. In addition, a transporting mechanism receives the crop material from the lifting mechanism and positively transports the crop material along a generally semicircular path substantially also without destroying the integrity of the windrow so that the crop material is positively transported generally in the first direction when it reaches an exit location where the crop material is dropped to the ground. The continued movement of the crop material by the transporting mechanism results in the crop material passing the exit location so that a lower surface of the windrow is repositioned to a top of the windrow.

9 Claims, 14 Drawing Sheets

AGRICULTURAL CROP MATERIAL WINDROW INVERTING METHOD AND APPARATUS

The present invention generally relates to agricultural equipment and methods and more particularly to an improved method and apparatus for inverting agricultural crop material windrows while maintaining the windrow's cohesive integrity.

It is common knowledge to agricultural producers that it is necessary to dry crop material that has been cut before it can be baled or similarly harvested. It is also known that agricultural material rarely dries evenly when it is placed in windrows. The sun can quickly dry the top portion of a windrow resulting in a very uneven moisture content of the agricultural material in the windrow from top to bottom. Various attempts have been made to manipulate a windrow of agricultural material, the lower portion of which is relatively wet. Known windrow inverters or turning apparatus also displace the windrow laterally which aids in the drying process because it often moves the agricultural material from the wet ground to dry ground.

As is disclosed in U.S. Pat. No. 4,738,092, a windrow inverter has a pull hitch that is connected to a tractor, with the inverter having a lift mechanism that lifts the hay of the windrow from the ground and drops it onto a transverse conveyor belt as the apparatus moves along the windrow. The transverse conveyor belt moves the hay laterally, and then deposits it on a shelf that has a chute which redirect it forwardly and then drops it to the ground. In this inverter, however, there is no mechanism associated with the shelf and chute which positively moves the hay through the chute, so that a bottleneck effect can result at the end of the transverse conveyor means. Since the movement of the hay through the chute is caused by the hay being deposited by the transverse conveyor means, i.e., new hay pushes the deposited hay through the chute, this can generally cause the hay to be fluffed and piled up, which tends to damage the cohesiveness or structural integrity of the windrow. This in turn can result in leaves being separated and the hay being more susceptible to wind loss under windy conditions.

Accordingly, it is a primary object of the present invention to provide an improved agricultural material windrow inverting method and apparatus that reliably inverts the windrow without damaging the structural integrity of the windrow.

Another object of the present invention is to provide such an improved agricultural material windrow inverting method and apparatus which reliably inverts the agricultural material windrow in a manner which minimizes rough handling that can result in a significant loss of material from the windrow and makes the windrow susceptible to further material loss due to windy conditions.

Still another object of the present invention is to provide such an improved agricultural material windrow inverting method and apparatus that lifts, turns, inverts and drops the windrow while maintaining continuous structural cohesiveness of the windrow to prevent fluffing of the agricultural material so that the repositioned windrow has a low susceptibility to material loss caused by windy conditions.

Other objects and advantages of the present invention will become apparent upon reading the following detailed description while referring to the attached drawings, in which.

DETAILED DESCRIPTION OF THE PREFERRED EMBODIMENT

Figure 1:
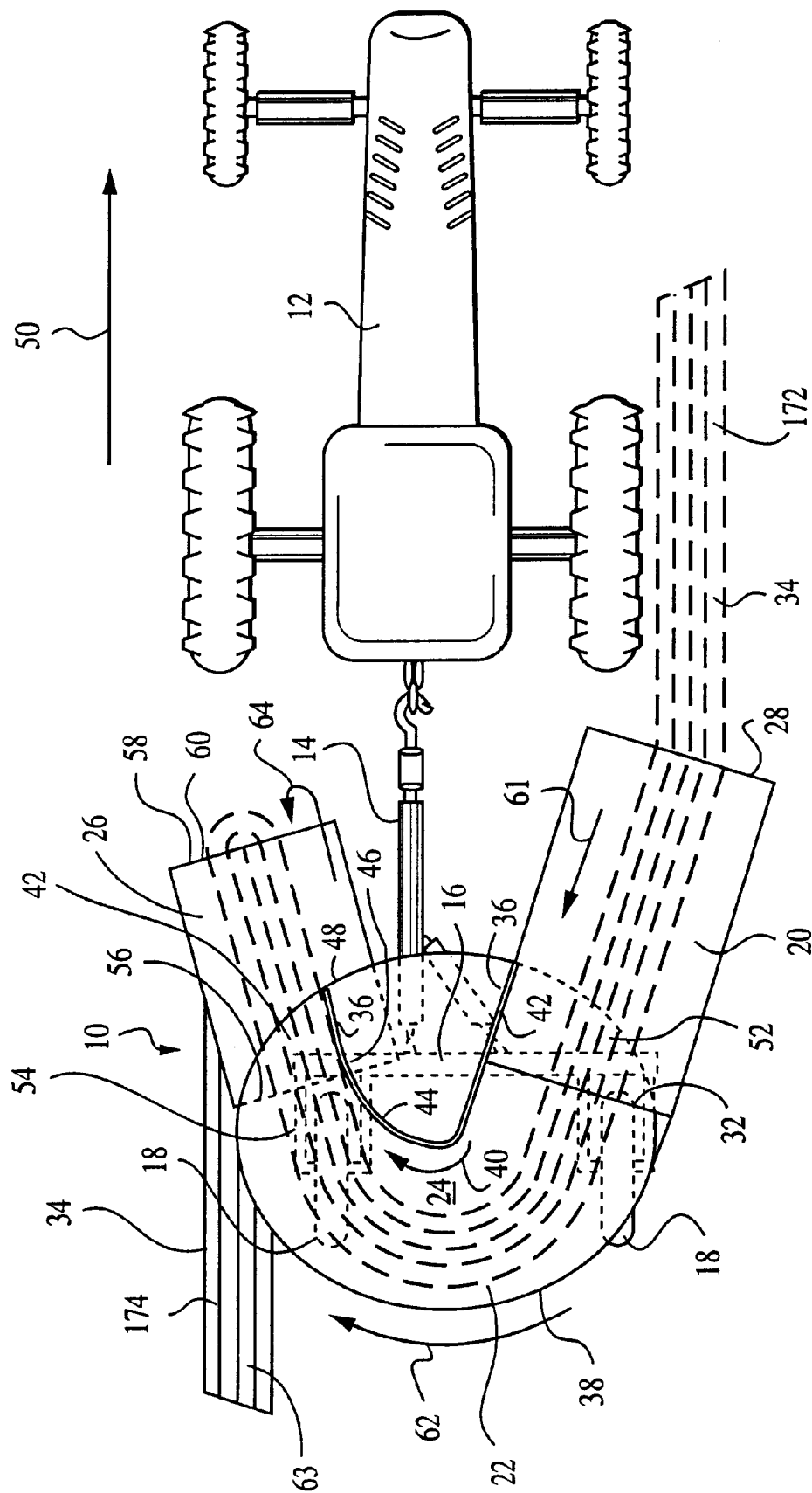
FIG. 1 is a greatly simplified top view of a first embodiment of an agricultural material windrow inverting apparatus hitched to a tractor moving along a windrow of agricultural material and illustrating the operation of the agricultural material windrow inverting apparatus.

Broadly stated, the present invention is directed to an agricultural crop material windrow apparatus for reliably inverting a windrow of crop material and also laterally relocating the windrow as the apparatus moves in a first direction along the windrow.

A windrow is an elongated row of crop material that has been cut and gathered and generally has a width and height that varies as a function of the type of plants, the height and bulk of the plants and the equipment that gathers the plants into the windrow. Windrows can be up to about 6 feet wide and about 2 to about 3 feet high is some circumstances. For the purposes of the present invention, agricultural crop material is defined to include hay, which can include many different plants that are considered to be hay, such as alfalfa, clover, prairie hay, brome grass, timothy hay and sorghum, for example. Crop material also includes wheat, barley, oats, rye, as well as bean crops, such as soybeans, the pinto and northern strains of beans, for example, but excluding the common vegetable beans. Other plants that are susceptible to being windrowed by agricultural producers shall be considered to be crop materials for the purposes of the present invention.

The apparatus is moved along a windrow and lifts the windrow, change its direction so that the windrow is turned into the direction of movement (i.e., the first direction) and deposits the windrow on the ground to form a new windrow adjacent the original one as it is moved. The apparatus deposits the windrow so that it is completely inverted, i.e., the bottom portion of the original windrow becomes the top portion of the new windrow and visa versa, and the inversion is carried out in a manner that minimizes disruption of the crop material that comprises the windrow, thereby maintaining its cohesive structure or integrity. This minimizes crop material loss that is caused by fluffing, mixing, or otherwise roughly treating the crop material, which results in leaves or other portions of a plant being separated from the stems of the plants which can therefore be lost. It also minimizes the losses that can occur if the inverting is being done under windy conditions.

The apparatus of the present invention is illustrated by several embodiments, but each embodiment has common components as will be apparent from this detailed description. Each embodiment has a lifting mechanism for lifting the crop material of the windrow from the ground substantially without destroying the integrity of the windrow as the apparatus moves in the first direction along the windrow.

The apparatus includes a transporting mechanism that receives the crop material from the lifting mechanism and defines an exit location where the crop material is dropped to the ground. The transporting mechanism positively transports the crop material along a generally semicircular horizontal path also substantially without destroying the integrity of the windrow. This configuration ensures that the crop material is moving generally in the first direction when it reaches the exit location, which is elevated a predetermined distance relative to the ground. In this regard, it is preferred that the distance be sufficiently high that the windrow can be dropped to the ground with sufficient clearance that it can easily and smoothly fold over on itself as that is what inverts the windrow. It is preferred that the distance be approximately 24 inches although a distance within the range of between 18 inches and 36 inches can be used.

The continued positive transportation or movement of the crop material by the transporting mechanism results in the crop material passing the exit location where the crop material is inverted and dropped to the ground. The previously upper surface is now repositioned nearest to the ground while the wet, previously lower surface now is relocated to the top of the windrow facing upward for efficient drying. This is established substantially without destroying the integrity of the windrow so as to maintain higher resistance to having leaves and loose crop material separated by moderate and high wind conditions.

Turning to the drawings, and particularly FIG. 1, a first embodiment of the apparatus of the present invention, indicated generally at 10, is shown connected to a vehicle or tractor 12 by a pull hitch member 14. A frame or toolbar 16 is carried above the ground by attached wheels 18 and the pull hitch member 14. In this embodiment, the toolbar 16 supports a lifting conveyor means 20 and a transporting mechanism 22 that includes a turntable 24 and a discharge conveyor means 26. The toolbar 16 also supports a hydraulic motor or other drive equipment (not shown) known in the art and used to rotate the turntable 24 and conveyor means 20, 26.

The lifting conveyor means 20 (best shown in FIG. 2) is preferably inclined so that a distal end 28 is sufficiently near the ground 30 to engage and lift the windrow while an opposite end 32 is located slightly above the turntable 24. The plane of the turntable 24 is preferably oriented generally at the same angle as the lifting conveyor means 20 and is slightly below the conveyor means so that the drop from the lifting conveyor means to the turntable does not appreciably affect the integrity or continuous cohesiveness of a windrow of crop material 34.

The transporting mechanism also has standing guides 36 and 38, preferably made of metal, that respectively define the inner and outer periphery of a generally semicircular horizontal path 40 on the turntable 24. The inner guide 36 has a first straight portion 42 near the lifting conveyor means that merges with an arcuate portion 44 generally at a right angle to the straight portion 42. A second straight portion 46 extends from the arcuate portion 44 near the discharge conveyor means 26. The inner guide 36 is preferably attached to the frame by methods known in the art in such a way that it does not interfere with the rotation of the turntable. The outer guide 38 is preferably semicircular and extends from the end 32 of the lifting conveyor means to the end 56 of the discharge conveyor means and is also attached to the frame by means known in the art. It will be appreciated that many other configurations for the inner and outer guides are possible as long as a generally U-shaped horizontal path is defined to turn the windrow 34 toward the direction of travel of the apparatus and tractor.

The discharge conveyor means 26 is preferably oriented generally parallel to the ground 30 to provide more distance from the discharge conveyor means to the ground for proper inversion of the windrow 34, although it can be oriented at the same vertical angle as the turntable 24,. A receiving end 56 of the discharge conveyor means 26 is located on or slightly below the turntable 24 while a discharge end 58 of the discharge conveyor means 26 is suspended above the ground and defines an exit location 60 where the crop material of the windrow 34 inverts while dropping to the ground 30.

Figure 2:
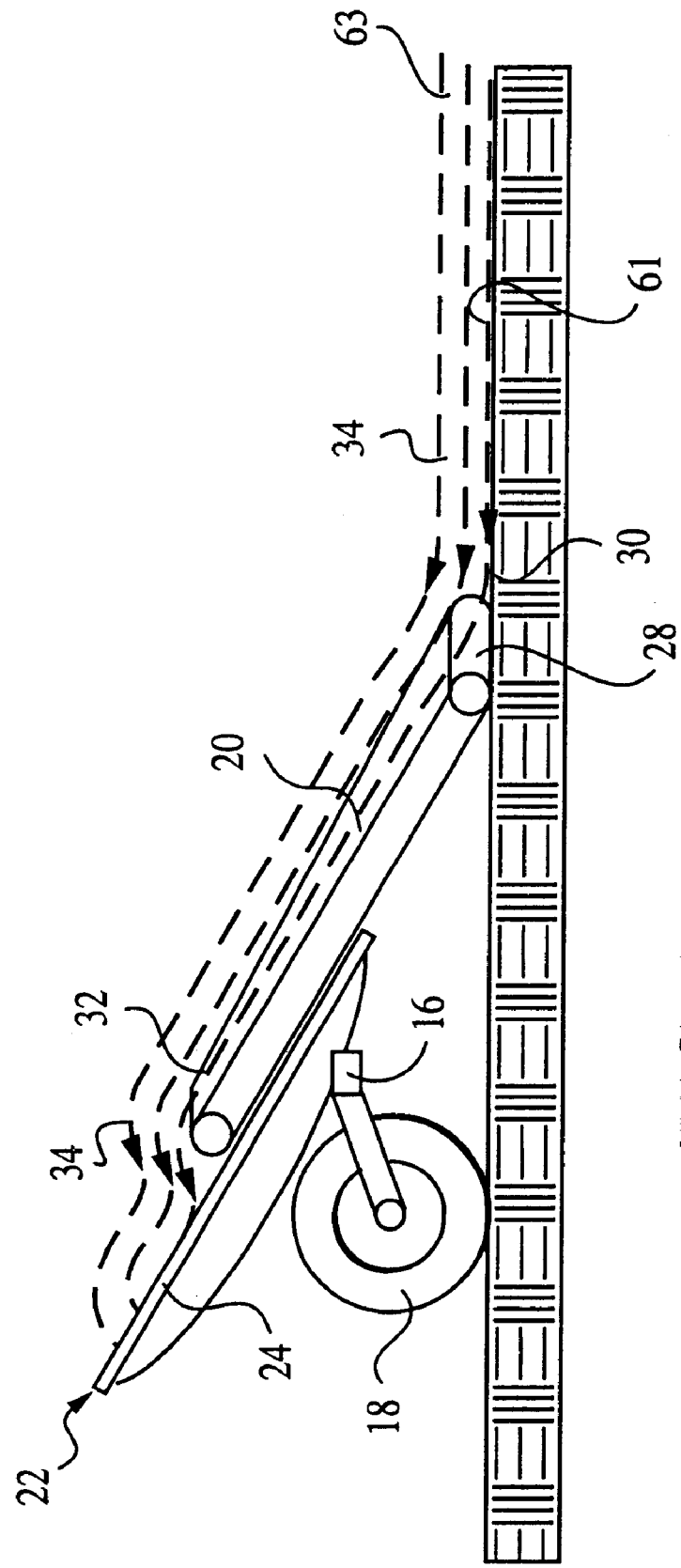
FIG. 2 is a greatly simplified right side view of the agricultural material windrow inverting apparatus shown in FIG. 1.

In the embodiment of FIGS. 1 and 2, both of the conveyor means 20, 26 are preferably positioned at an acute angle relative to the first direction 50 results in the ends away from the turntable being wider apart which enables the apparatus to be drawn directly behind the tractor without the tractor wheels interfering with the windrow.

In operation, the tractor 12 pulls the windrow inverting apparatus 10 along the elongated generally continuous windrow of crop material 34 on the ground 30 in the first direction 50. This allows the distal end 28 of the lifting conveyor means 20 to lift the windrow 34 onto the lifting conveyor means 20 without interrupting the generally continuous structural cohesiveness of the windrow 34. The lifting conveyor means 20 carries the windrow 34 up to the transporting mechanism 22 (as shown by arrow 61) and places the windrow on the transporting mechanism without destroying the integrity of the windrow. The rotation of the turning table 24 also tends to pull the windrow from the lifting conveyor means 20.

The transporting mechanism 22 then positively transports the lifted crop material or windrow 34 along the generally semicircular path 40 by carrying the windrow on the rotating turntable 24 in the direction shown by arrow 62. The rotation of the turntable 24 coupled with the guides 36, 38 change the direction of the windrow 34 so that the windrow first moves in the opposite direction of the first direction 50 and then is rotated to move generally in the first direction substantially without destroying the continuous structural cohesiveness of the windrow along the entire length of the semicircular horizontal path 40. In the first embodiment shown in FIGS. 1 and 2, the windrow 34 is then delivered to the discharge conveyor means 26, which positively transports the crop material until it is moved in the first direction 50 until the windrow 34 reaches the exit location 60. This prevents any bottlenecking action at the exit location 60 and ensures the integrity of the windrow 34 is maintained.

Finally, the windrow is dropped to the ground 30 at the exit location 60 (as shown by arrow 64). The discharge end 58 of the discharge conveyor means 26 directs the crop material downward so that a previously wet lower surface 63 is inverted or repositioned on top of the windrow 34 (as shown in FIG. 1) and visa versa. It should be appreciated that the speed of movement of the windrow as it moves through the apparatus from the lifting conveyor means to the transporting mechanism to the discharge conveying means is substantially the same so that the windrow is neither stretched or attenuated or compressed. In this regard, it is important that the linear speed of movement of the windrow through the apparatus be substantially the same as the speed of movement of the tractor so that such attenuation or compression does not occur.

While positive transportation for this embodiment means carrying the windrow 34 such as by turntable 24 or conveyor means 20, 26, it also includes any mechanism that moves the windrow in the intended direction without either attenuating or compressing the windrow. Positive transportation, as it is used here, cannot be accomplished merely by a downward inclining chute or having crop material push on crop material without any other assistance as in the prior art, since crop material positioned in the chute may not reliably slide through the chute unless crop material piles up behind it to overcome the friction of the surface of the chute. If the crop material delivered from a transverse conveyor means itself is providing a driving force, again enough crop material must be delivered to create a large enough force to overcome the friction of the surface of the chute. This intermittent pile-up and slide action in the prior art cannot be positive transportation since it does not create constant or continuous flow of the crop material as is desired.

Figure 3:
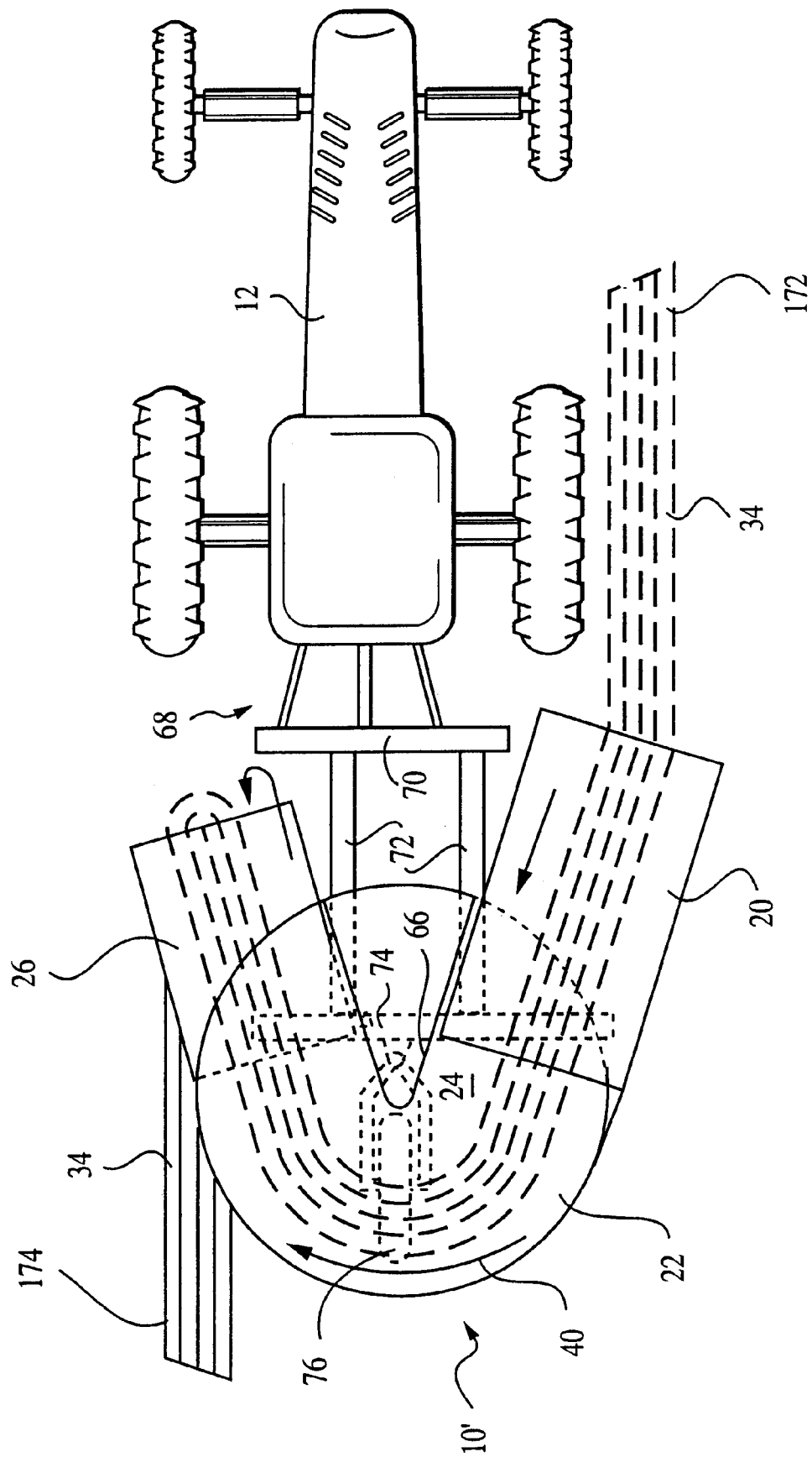
FIG. 3 is a greatly simplified top view of a modified version of the agricultural material windrow inverting apparatus shown in FIG. 1.
Figure 4:
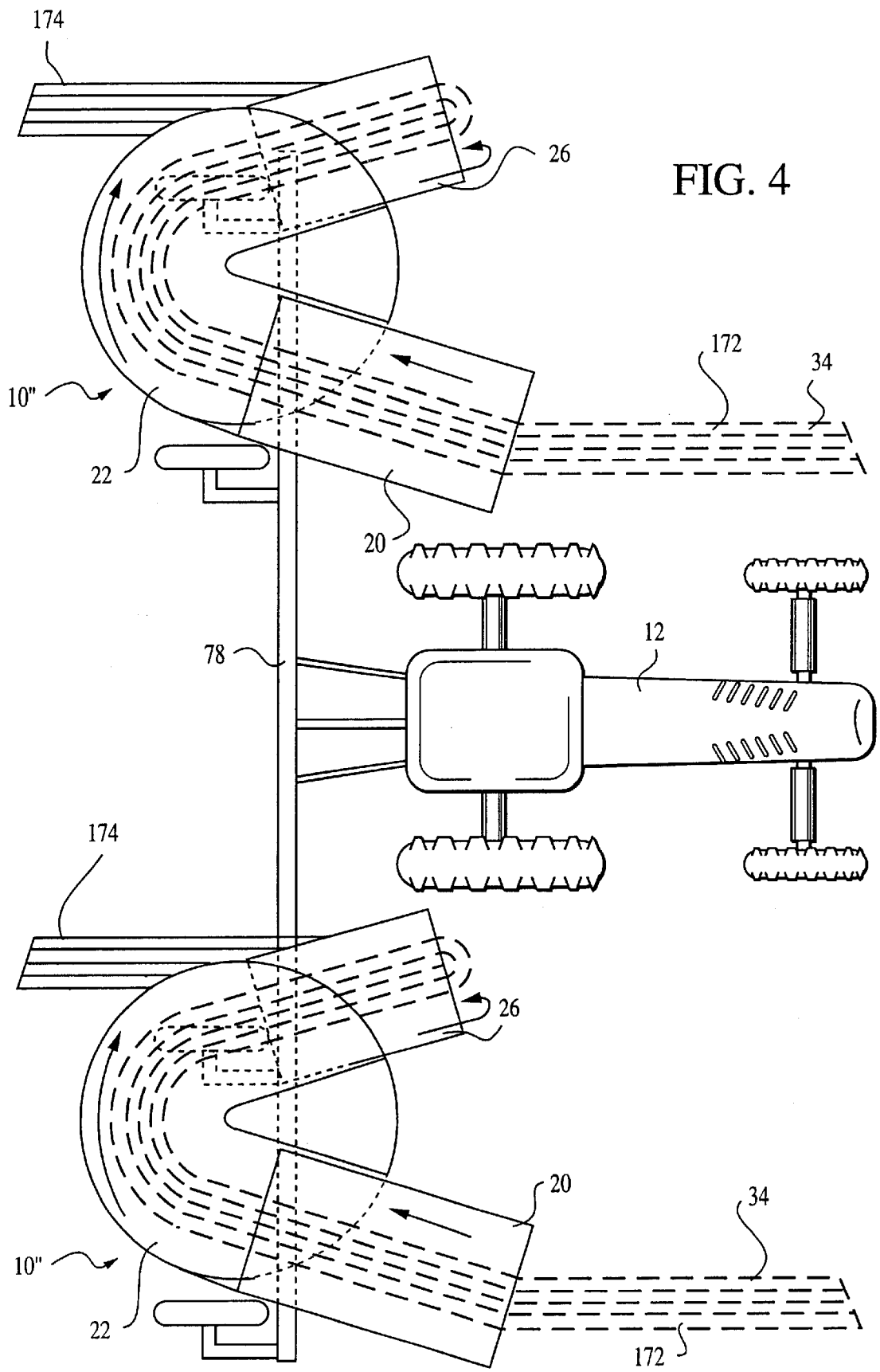
FIG. 4 is a greatly simplified top view of another modified version of the agricultural material windrow inverting apparatus shown in FIG. 1, particularly illustrating apparatus for simultaneously inverting two windrows.

Referring now to FIGS. 3 and 4, modified versions of the apparatus 10 are shown with alternative inner guides and alternative hitch structures. The description of the features already described for the apparatus 10 apply for the apparatus 10' or 10" and will not be repeated.

For one modified version of the embodiment of FIGS. 1 and 2, and referring to FIG. 3, apparatus 10' has a V-shaped inner guide 66 instead of the inner guide 36 described above. Further, instead of a one point hitch, a three point hitch 68 is used with frame members 70 and 72 that are attached to a toolbar 74 which has a single wheel 76. In another modified version shown in FIG. 4, two of the apparatus 10" are supported by a long toolbar 78 so that the tractor can simultaneously repositions two windrows 34.

Figure 5:
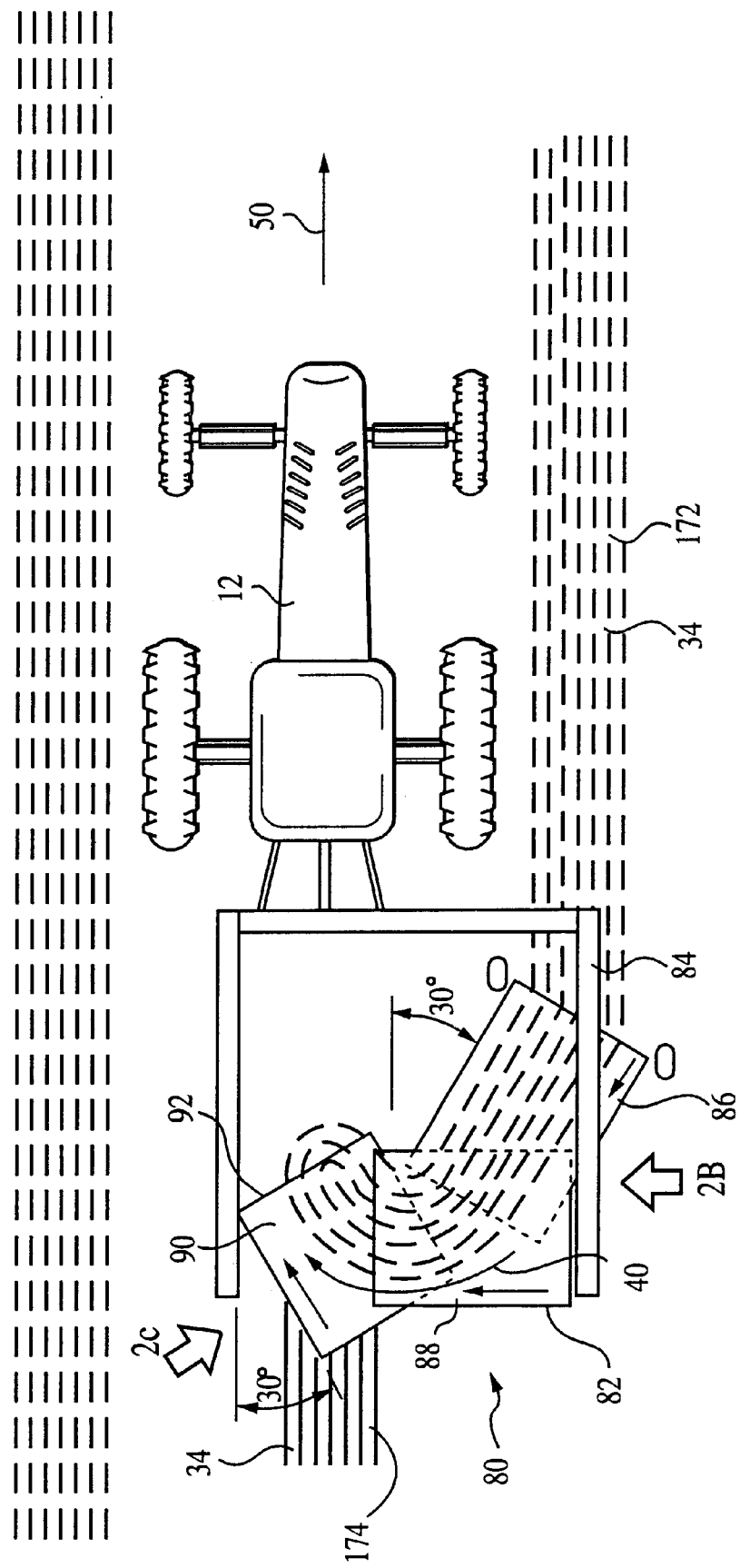
FIG. 5 is a greatly simplified top view of a second embodiment of an crop material windrow inverting apparatus moving along a windrow of crop material.
Figure 6:
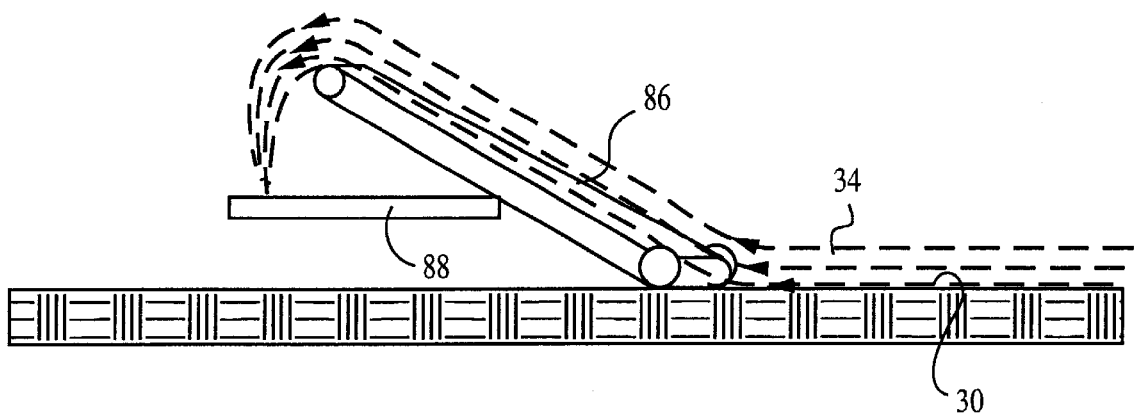
FIG. 6 is a greatly simplified right side view of the crop material windrow inverting apparatus shown in FIG. 5.
Figure 7:
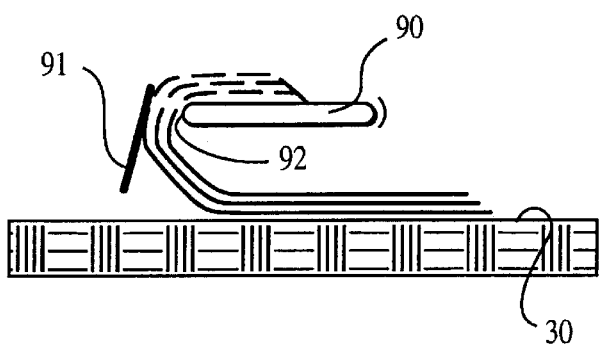
FIG. 7 is a greatly simplified left side view of the crop material windrow inverting apparatus shown in FIG. 5.

In another embodiment of the present invention, and referring to FIGS. 5, 6 and 7, an apparatus 80 has a transporting mechanism 82 supported on a frame 84. Instead of a turntable 24, the transporting mechanism 82 has three generally straight conveyor means 86, 88 and 90 that are positioned to generally define the semicircular horizontal path 40. A first conveyor means 86 positively transports the crop material 34 generally opposite of the first direction 50 while a second conveyor means 88 positively transports the crop material received from the first conveyor means generally transverse to the first direction. A third conveyor means 90 positively transports the crop material 34 received from the second conveyor means 88 generally in the first direction 50. The first and third conveyor means 86, 90 are preferably positioned at approximately 30° angles relative to the first direction as shown in FIG. 5.

While the lifting or first conveyor means 86 is inclined, the second and third conveyor means 88, 90 are preferably positioned parallel to the ground 30 as shown in FIGS. 6 and 7. The vertical drop from one conveyor means to the next conveyor means is kept to a minimum to avoid any unnecessary roughing or fluffing of the crop material. While a drop of a few inches is preferred, the desirable minimum drop will depend on the thickness, length and angle of the conveyor means 86. While not preferred, the embodiment of FIG. 5 can be modified to include a deflector 91 (see FIG. 7) and if so, it is attached to the frame 84 by means known in the art and preferably suspended above the ground 30 near an exit location 92 defined by the third conveyor means 90.

Figure 8:
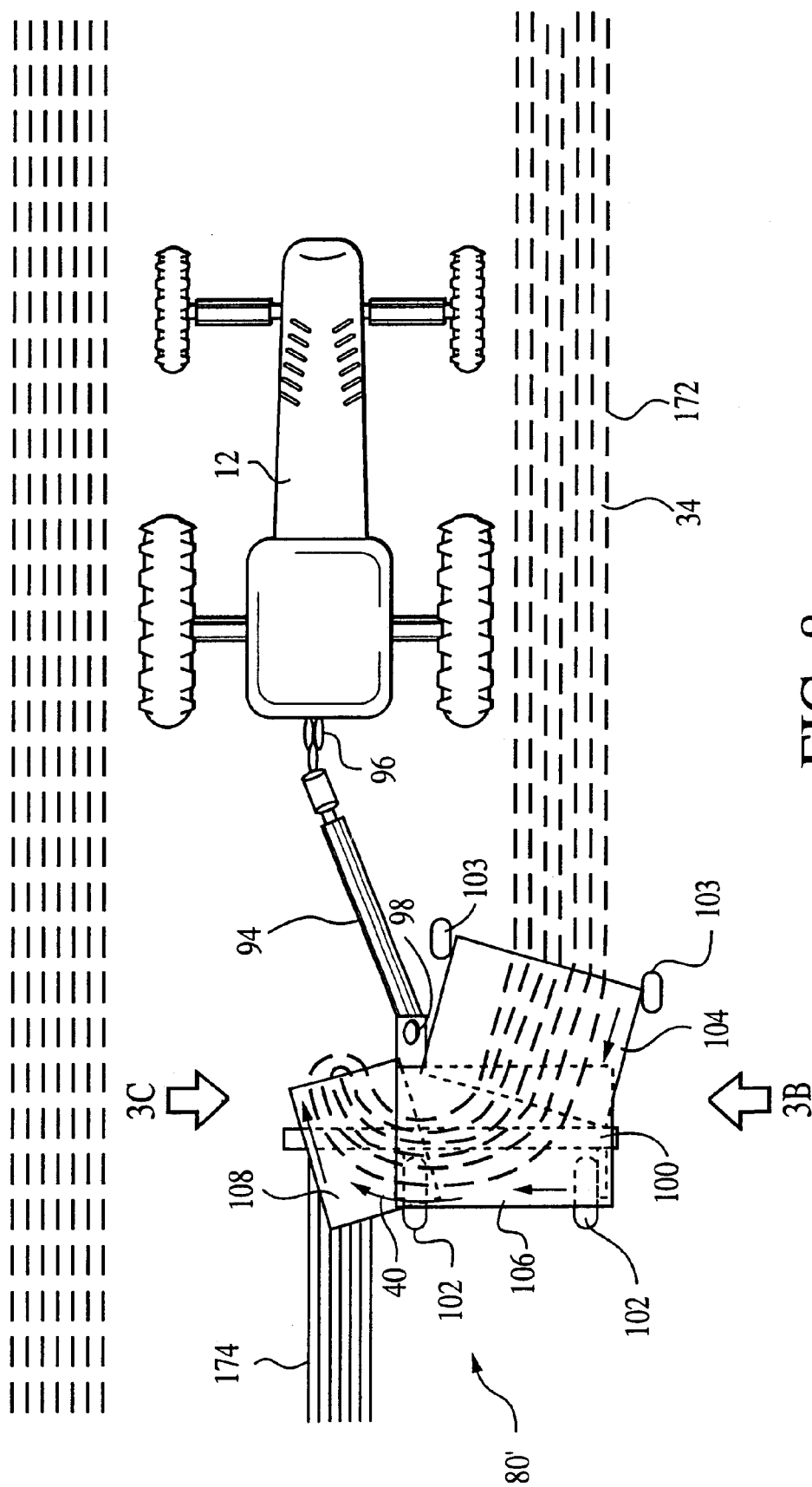
FIG. 8 is a greatly simplified top view of a modified version of the crop material windrow inverting apparatus shown in FIG. 5.
Figure 9:
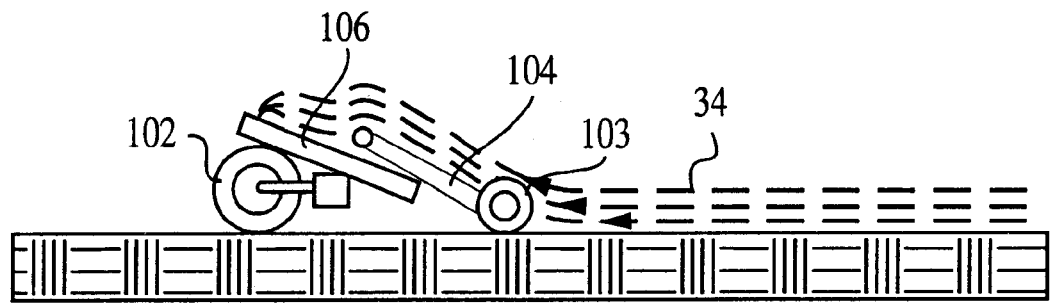
FIG. 9 is a greatly simplified right side view of the crop material windrow inverting apparatus shown in FIG. 8.
Figure 10:
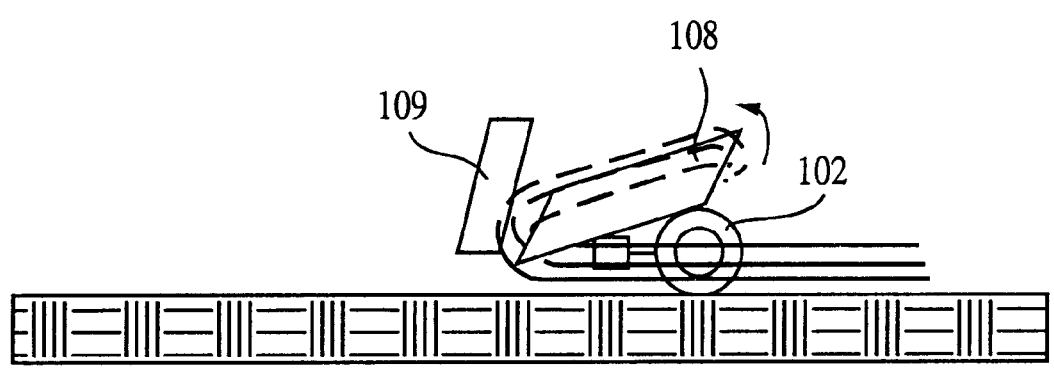
FIG. 10 is a greatly simplified left side view of the crop material windrow inverting apparatus shown in FIG. 8.

In a modified version of the apparatus 80 shown in FIG. 8, an apparatus 80' has a single tongue pull hitch member 94 that pivotably attached to a tractor hitch member 96 and to a frame portion 98. A toolbar 100 portion of the frame carries wheels 102 and 103. Similar to apparatus 80 of FIG. 5, apparatus 80' has three conveyor means 104, 106 and 108 supported by the toolbar 100 and positioned as described above for apparatus 80. In this modified version however, the second conveyor means 106 is also inclined at a forward vertical angle as close to the vertical angle of the first conveyor means 104 as possible to further reduce the drop distance from the first conveyor means to the second conveyor means 106 (see FIG. 9). Moreover, the third conveyor means 108 is laterally vertically inclined forming a pitch toward the second conveyor means 106 (see FIGS. 8, 9 and 10). The inclined conveyor means 104, 106 and 108 further maintain the generally semicircular horizontal path 40, which maintains the integrity of the windrow 34. Apparatus 80' preferably does not have a deflector, but may be further modified to include a deflector 109 as shown in FIG. 10.

Figure 11:
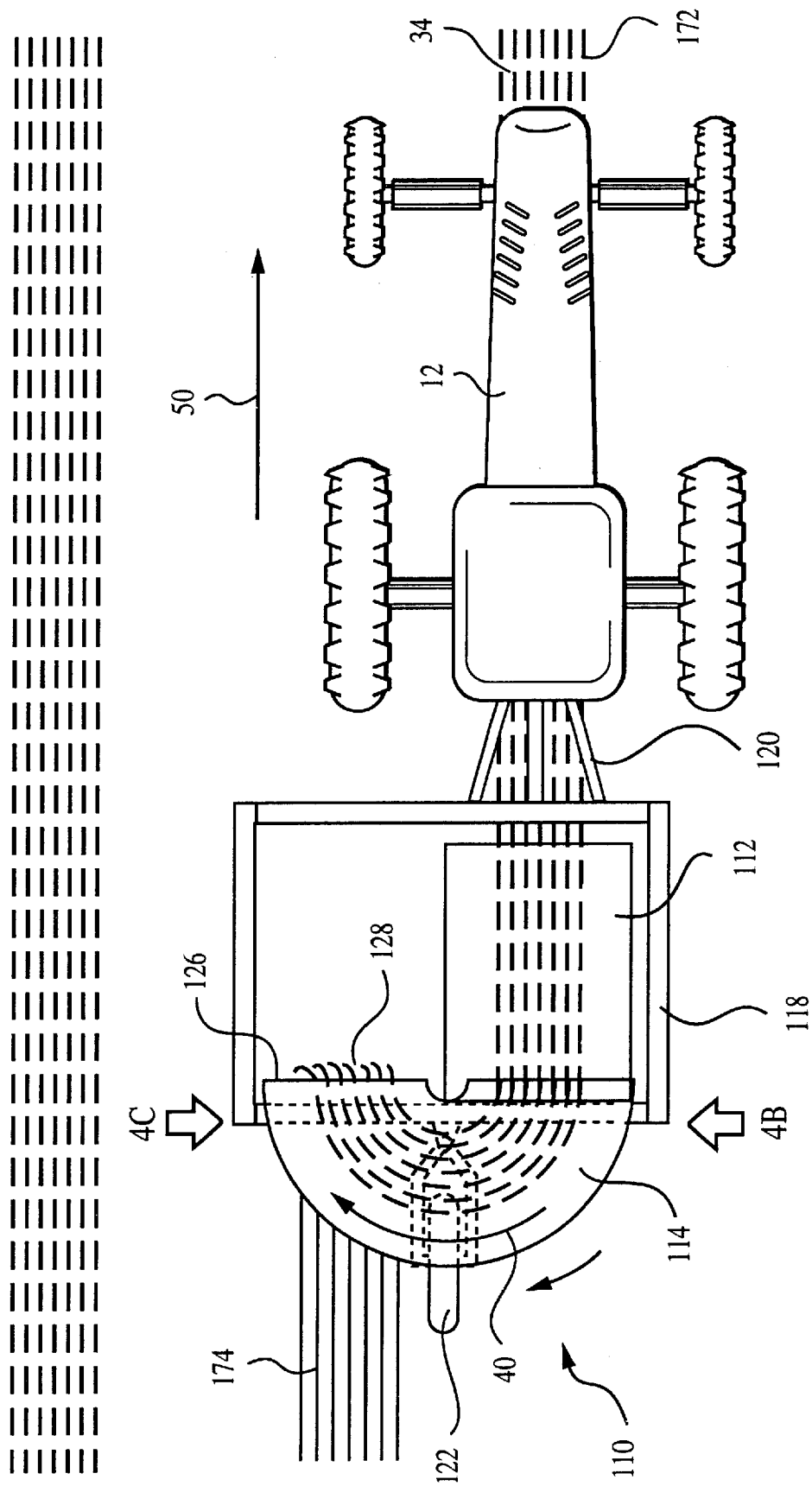
FIG. 11 is a greatly simplified top view of a third embodiment of an crop material windrow inverting apparatus moving along a windrow of crop material.

Turning now to FIG. 11, in another embodiment of the present invention, an apparatus 110 has a lifting conveyor means 112 and a transporting mechanism with a generally semicircular horizontal turning conveyor means 114 to positively transport the windrow through the semicircular horizontal path 40. The transporting mechanism is supported on frame 118, which in turn, is supported by a three-point hitch 120 to tractor 12 and a wheel 122. It should be understood that while the embodiment of FIG. 11 is shown as being supported by a three-point hitch, it can be configured with additional wheels and a pull hitch of the type shown with the embodiments illustrated in FIGS. 1, 8 and 19.

Figure 12:
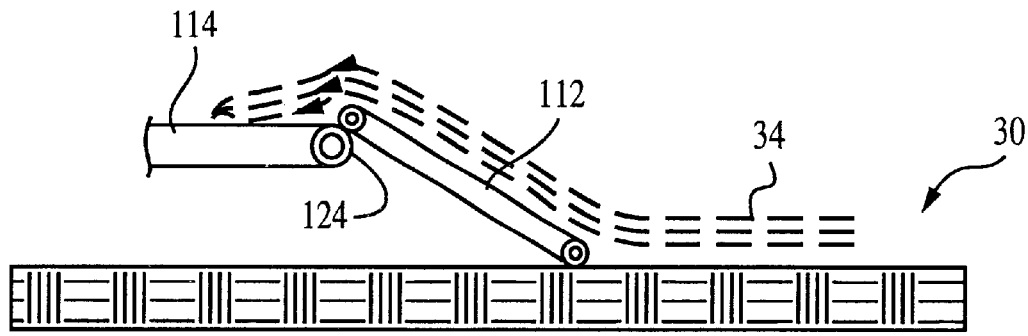
FIG. 12 is a greatly simplified right side view of the crop material windrow inverting apparatus shown in FIG. 11.

The lifting conveyor means 112 is preferably disposed parallel to the first direction 50 (see FIG. 11) to meet the receiving end 124 of the turning conveyor means 116 (see FIG. 12). The turning conveyor means 116 is preferably disposed generally parallel to the ground 30 and has a discharge end 126 that defines an exit location 128 that is oriented to drop the windrow in the first direction 50.

Figure 13:
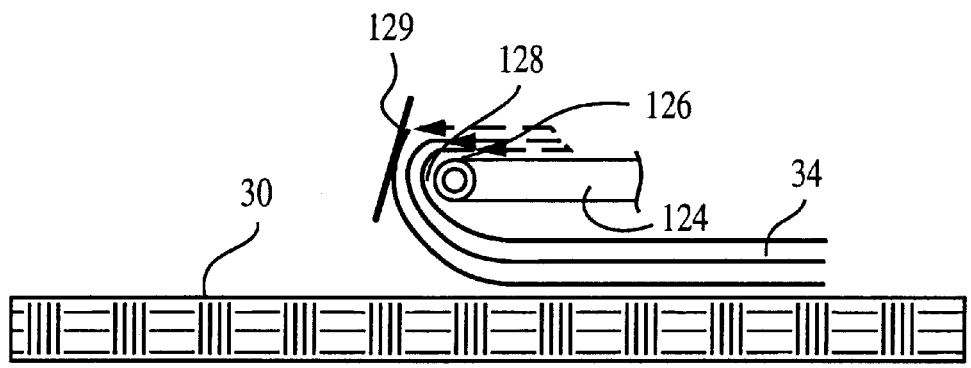
FIG. 13 is a greatly simplified left side view of the crop material windrow inverting apparatus shown in FIG. 11.

While the apparatus 110 shown in FIG. 11 preferably does not have any kind of deflector at the exit location 126, it may be modified to include a deflector 129 as shown in FIG. 13.

Figure 14:
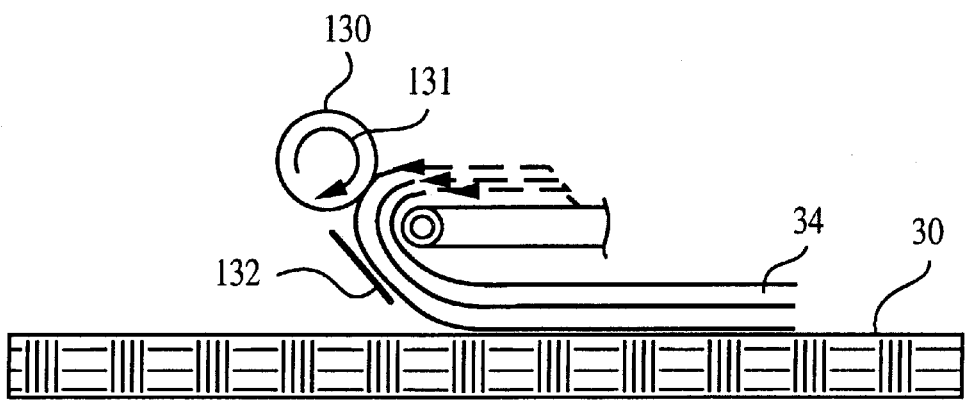
FIG. 14 is a greatly simplified left side view of a modification to the crop material windrow inverting apparatus shown in FIG. 11.

Instead of, or in addition to, a deflector, a vertically rotating discharge drum 130 can also be mounted above the ground near the exit location 126 (by methods known in the art), alone or above another deflector 132 (FIG. 14) for rotating toward the discharge end 126 as shown by arrow 131 to further guide the travel of the windrow 34 as it drops to the ground.

The apparatus 110 is positioned so that when the tractor 12 drives directly over the windrow 34, the lifting conveyor means 112 is aligned with the windrow 34 directly behind the tractor 12 and the windrow is dropped from the exit location 126 off to a side of the tractor 12. If a pull hitch is employed, the tractor may travel along the side of the windrow in the manner as shown in FIG. 1, for example.

Figure 15:
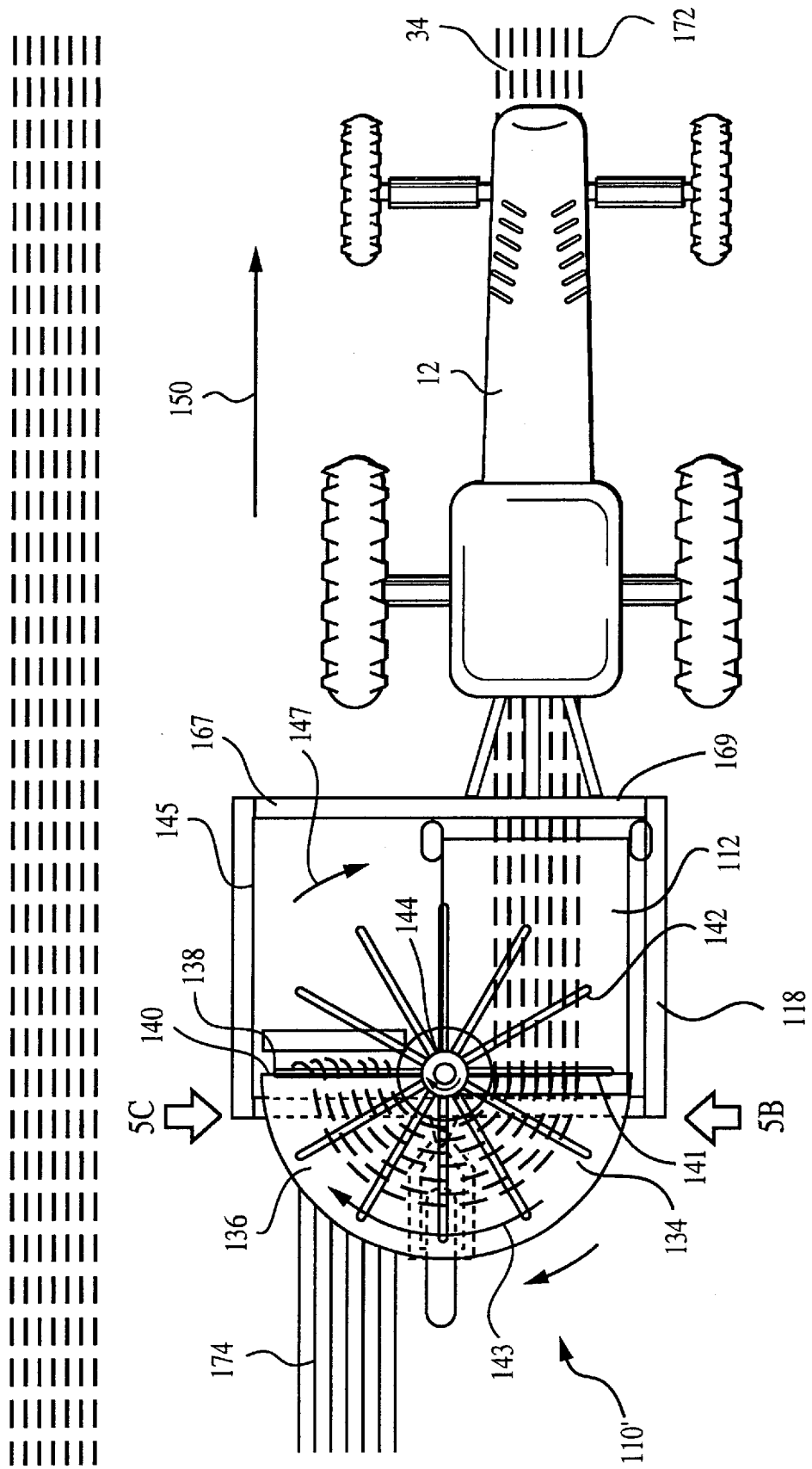
FIG. 15 is a greatly simplified top view of a fourth embodiment of the crop material windrow inverting apparatus embodying the present invention.
Figure 17:
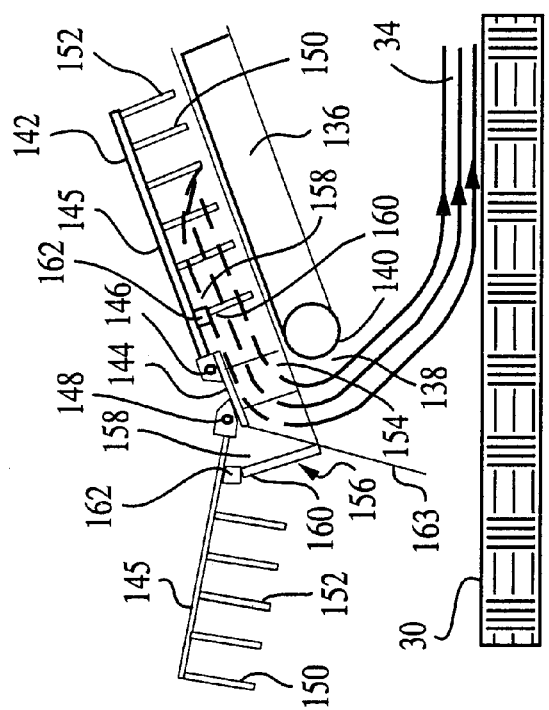
FIG. 17 is a greatly simplified left side view of the crop material windrow inverting apparatus shown in FIG. 15.

In a further embodiment of the present invention, and referring to FIG. 15, an apparatus 110' has a transporting mechanism 134 with a turning conveyor means 136 disposed at a vertical incline at generally the same angular orientation as the lifting conveyor means 112 and defines an exit location 138 where the crop material drops back to the ground 30. Similar to the turntable 24, the turning conveyor means 136 is inclined to reduce the drop from the lifting conveyor means 112 and to further maintain the integrity of the windrow 34.

In this embodiment, the transporting mechanism 134 also has a raking wheel 142 positioned above the turning conveyor means 136 and that rotates clockwise (as shown by arrow 147) for further positively transporting the windrow along the semicircular horizontal path 143. The raking wheel 142 also further ensures the windrow 34 is continuously moving in the first direction 150 when it reaches the exit location 138.

The raking wheel 142 has a hub 144 and spokes 145 extending radially and horizontally from the hub. Each of the spokes 145 also is vertically rotatably attached to the hub 144, preferably by pins 146 in holes 148. A rake 150 is positioned on each spoke 145 with downwardly extending prongs 152 for engaging the crop material 34 and then for moving the crop material 34 along the semicircular horizontal path 143 on the turning conveyor means 136.

The hub 144 is generally horizontally rotatably attached to a base 154. A spoke raising mechanism 156 encircles the base 154 and has a top edge 158 that defines a cam 160. Each spoke 145 also has a cam follower 162 that engages the cam 160. As the rake wheel 142 rotates, the cam followers 162 roll on the cam 160 and raise and lower as the spokes rotate along the cam.

Figure 16:
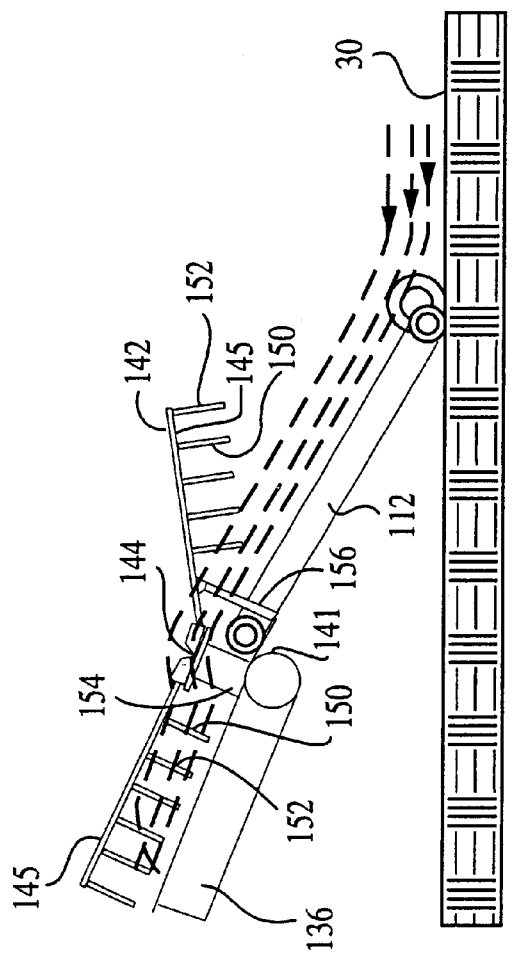
FIG. 16 is a greatly simplified right side view of the crop material windrow inverting apparatus shown in FIG. 15.

The cam 160 is shaped so that each spoke 145 rises when it generally reaches the exit location 138 to avoid interfering with the dropping windrow and to avoid a deflector 163. The cam 160 is also shaped so that each spoke lowers upon reaching the receiving end 141 of the turning conveyor means 136 where the windrow is received from the lifting conveyor means 112 (as shown in FIG. 16). When the spokes 145 are suspended above the turning conveyor means 136 and rotate from the receiving end 141 to the exit location 138, the prongs 152 are preferably just touching or held a few inches above the conveyor means 136.

It should also be appreciated that the conveyor means 136 may not be needed if the rake wheel structure is used, inasmuch as the rake wheel may be sufficient to positively move the windrow in the semicircular path. The conveyor means can be replaced by a preferably smooth stationary platform having the same surface area and configuration as the conveyor means 136 shown in FIG. 15. The prongs 152 should be positioned to maintain a steady constant flow of the crop material while preventing jams. Also in this embodiment, the raking wheel 142 should be rotating generally at the same speed as the turning conveyor means 136 for highest efficiency and also to prevent any bottlenecking action.

Figure 18:
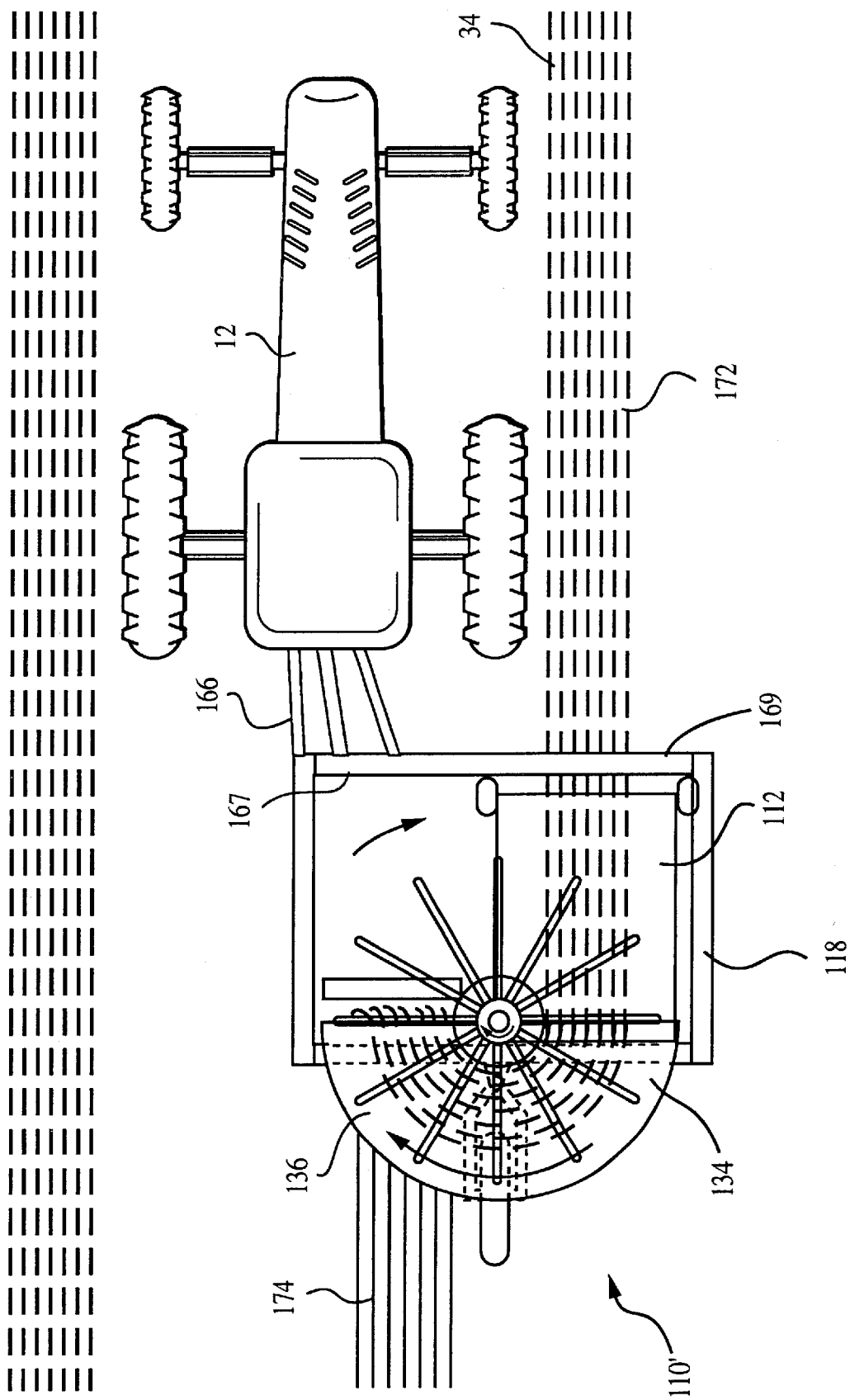
FIG. 18 is a greatly simplified top view of a modified version of the crop material windrow inverting apparatus shown in FIG. 15; and, FIG. 19 is a greatly simplified top view of another modified version of the crop material windrow inverting apparatus shown in FIG. 15.

A further modified version of apparatus 110' of FIG. 15 is shown in FIG. 18, and uses a three point hitch 166 to attach to a different location (left side 167 rather than right side 169) on the frame 118 so that the tractor 12 drives along the side of the windrow 34, instead of over it, and the windrow is dropped back to the ground directly behind the tractor 12.

Figure 19:
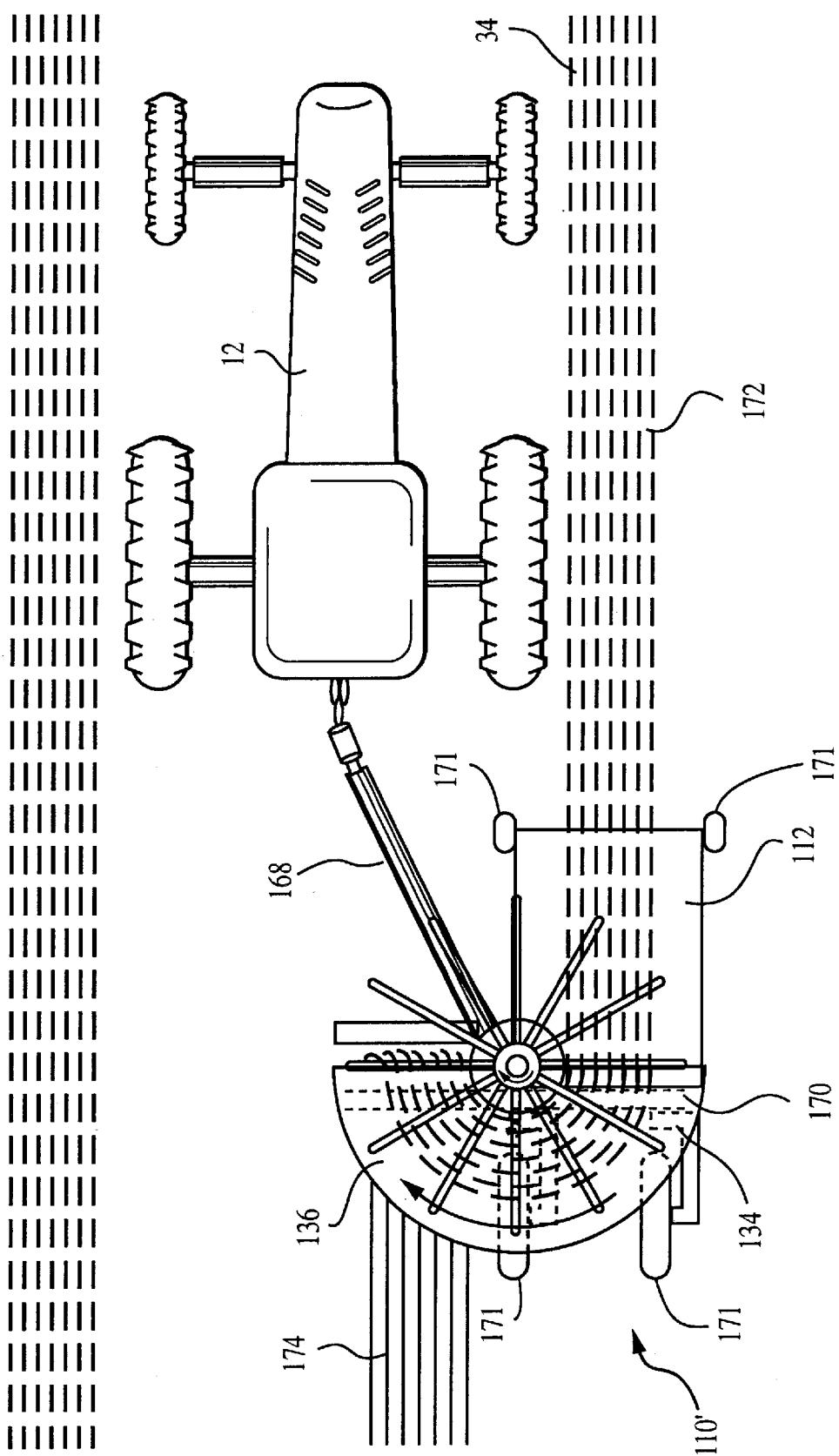

Still another modified version of apparatus 110' of FIG. 15 is shown in FIG. 19, and uses a single pull hitch 168 connected to a frame 170 to which wheels 171 are mounted, similar to the hitch shown in FIG. 10.

It will be appreciated that each of the apparatus 10, 10', 80, 80', 110, 110' described above can be configured for any of the lateral configurations shown in the drawings. For example, turning again to FIG. 1, a first lateral location 172 defines the lateral location where the windrow 34 is lifted from the ground 30 and a second lateral location 174 defines where the exit location is suspended and drops the windrow back to the ground. As shown in FIG. 1, the first location 172 is on one side of the tractor 12 and the second location 174 is on an opposite side of the tractor 12. In the alternative, as shown in FIG. 4, both the first and said second locations 172, 174 are located on the same side of the tractor 12. As another alternative, the apparatus 10 can be positioned so that the first location 172 is directly underneath or behind the tractor 12 and the second location 174 is on either side of the tractor 12 similar to that shown in FIGS. 11 and 15. In a further alternative the apparatus 10 can also be positioned so that the first location 172 is on either side of the tractor 12 and the second location 174 is directly behind the tractor 12. These alternatives are possible for each of the apparatus 10', 80, 80', 110, 110'.

From the foregoing detailed description, it should be evident that an crop material windrow inverting apparatus has been shown and described which has many desirable attributes. The apparatus effectively inverts and repositions the windrow in a way which minimizes crop material loss due to rough handling and wind effects. It has demonstrated superior operability in that it maintains the basic integrity of the windrow to further ensure that the bottom most and wettest layer of crop material sitting directly on wet ground is inverted to the top of the repositioned windrow for efficient drying. It also lifts, turns, inverts and drops the windrow while maintaining structural cohesiveness of the windrow to prevent fluffing of the crop material so that the repositioned windrow is not greatly susceptibility to crop material loss caused by moderate winds.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. Apparatus for inverting a windrow of crop material on the ground as said apparatus is moved along the windrow in a first direction, the windrow having a lower surface and a generally defined width, said apparatus comprising:

lifting means for lifting the crop material of the windrow from the ground and moving the same in a second direction opposite the first direction, the lifting and moving being done substantially without destroying the integrity of the windrow;

transporting means for receiving the crop material from said lifting means and for positively transporting the crop material along a generally semicircular horizontal path substantially without destroying the integrity of the windrow so that the crop material is positively transported to an exit location that is elevated a predetermined distance relative to the ground, the continued movement of the crop material by said transporting means resulting in the crop material passing the exit location where the crop material is dropped to the ground so that the lower surface is repositioned at the top of the windrow substantially without destroying the integrity of the windrow, said transporting means comprising an arcuate conveyor belt that substantially traverses said semicircular path for moving the crop material along said semicircular path, and said exit location is an end of said arcuate conveyor.

2. The apparatus as defined in claim 1 wherein said lifting means and said transporting means are adapted to move said windrow at substantially the same speed as the apparatus is moved along the windrow.

3. The apparatus as defined in claim I further comprising a frame means having wheels mounted thereto for supporting said lifting means and said transporting means.

4. The apparatus as defined in claim 1 wherein said lifting means is a lifting conveyor belt inclined to receive the crop material on the ground and carry the crop material up to said transporting means, said transporting means being positioned slightly below the elevation of the end of said lifting conveyor belt.

5. The apparatus as defined in claim 1 further comprising a deflector mounted above said ground at a vertical orientation near said exit location so that the crop material discharging from the apparatus at said exit location is further directed for inversion of the crop material of said windrow.

6. Apparatus for inverting a generally continuous windrow of crop material on the ground as said apparatus is moved along the windrow in a first direction, the windrow having a lower surface and a generally defined width, said apparatus comprising:

lifting means for lifting the crop material of the windrow from the ground and moving it in a second direction opposite the first direction without interrupting the generally continuous structural cohesiveness of the windrow as the apparatus moves in the first direction;

transporting means for receiving the crop material from said lifting means and for positively transporting the crop material along a generally horizontal path that changes direction from said second direction to said first direction substantially without destroying the continuous structural cohesiveness of the windrow so that the crop material is moving generally in the first direction when it reaches an exit location that is elevated a predetermined distance relative to the ground, continued movement of the crop material by said transporting means resulting in the crop material passing the exit location where the crop material is dropped to the ground with the lower surface being repositioned to face upwardly and said width being maintained, substantially without destroying the continuous structural cohesiveness of the windrow, said transporting means comprising an arcuate conveyor belt that substantially traverses said semicircular path for moving the crop material along said semicircular path, and said exit location is an end of said arcuate conveyor.

7. A method for inverting a generally continuous windrow of crop material on the ground using an apparatus that is moved along the windrow in a first direction, the windrow having a lower surface and a generally defined width, said method comprising the steps of:

lifting the crop material of the windrow from the ground without interrupting the generally continuous structural cohesiveness of the windrow as the apparatus moves in the first direction;

positively transporting the lifted crop material along a generally horizontal semicircular path on an arcuate conveyor belt that moves the crop material to an exit located at the end of said arcuate conveyor, said path changing direction from a direction opposite of said first direction to said first direction substantially without destroying the continuous structural cohesiveness of the windrow; and, dropping the crop material to the ground with the previous lower surface being repositioned on the top of the dropped windrow substantially without destroying the continuous structural cohesiveness of the windrow.

8. A method as defined in claim 7 wherein the speed of linear movement of the windrow during the steps of lifting and positively transporting the crop material of the windrow is substantially the same so that the windrow is not appreciably attenuated or compressed during such movement.

9. A method as defined in claim 8 wherein the speed of linear movement of the windrow during the steps of lifting and positively transporting the crop material of the windrow is substantially the same as the speed of the apparatus in the first direction.

* * * * *